F. H. HART.
WINDOW FASTENER.
APPLICATION FILED NOV. 2, 1920.
1,370,109.
Patented Mar. 1, 1921.
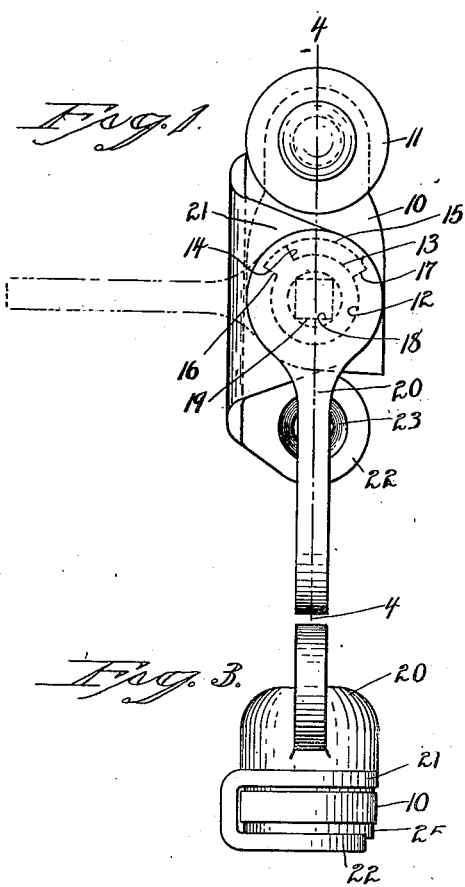
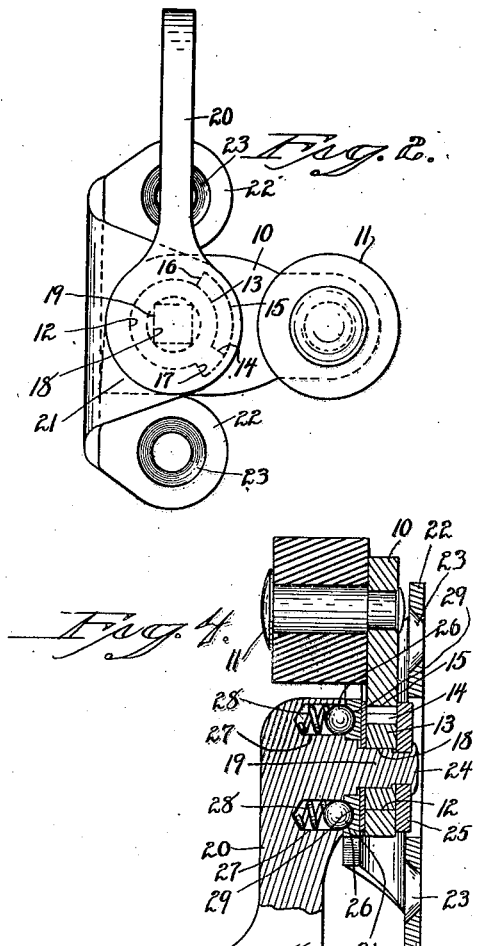
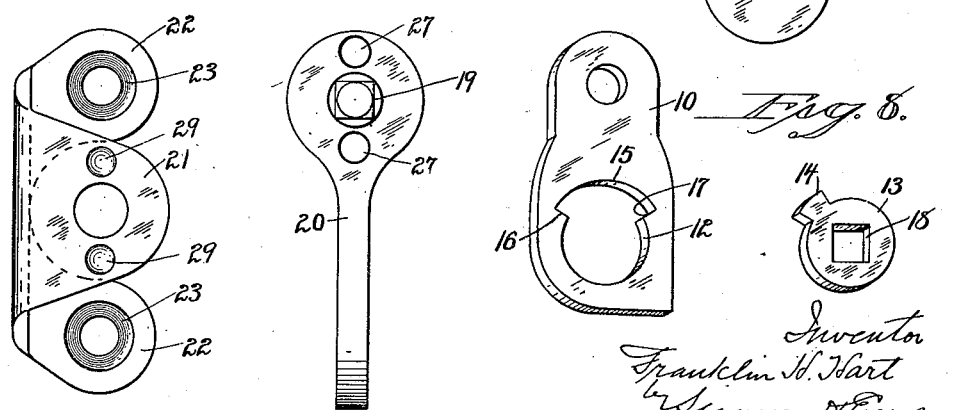
Inventor
Franklin H. Hart
by Seymour & Earle
Attys

UNITED STATES PATENT OFFICE.

FRANKLIN H. HART, OF NEW HAVEN, CONNECTICUT, ASSIGNOR TO C. COWLES & CO., OF NEW HAVEN, CONNECTICUT, A CORPORATION.

WINDOW-FASTENER.

1,370,109.      Specification of Letters Patent.      Patented Mar. 1, 1921.

Application filed November 2, 1920. Serial No. 421,378.

*To all whom it may concern:*

Be it known that I, FRANKLIN H. HART, a citizen of the United States, residing at New Haven, in the county of New Haven and State of Connecticut, have invented a new and useful Improvement in Window-Fasteners; and I do hereby declare the following, when taken in connection with the accompanying drawings and the characters of reference marked thereon, to be a full, clear, and exact description of the same, and which said drawings constitute part of this application, and represent, in—

Figure 1, a top or plan view of a window fastener constructed in accordance with my invention and shown with the bolt in the retired position.

Fig. 2, a similar view showing the bolt in drawn position.

Fig. 3, an end view.

Fig. 4, a sectional view on the line 4—4 of Fig. 1.

Fig. 5, a plan view of the casing detached.

Fig. 6, an underside view of the lever detached.

Fig. 7, a perspective view of the bolt detached.

Fig. 8, a perspective view of the turn block detached.

This invention relates to an improvement in window fasteners and particularly to window fasteners which are used on vehicles to prevent rattling of the sashes, and is an improvement on the construction shown and described in United States Patent No. 1,028,452, dated June 4, 1912. As shown and described in that patent, the fastener comprises a bolt and an operating lever so arranged that when the bolt is in either its thrown or retired position the lever will not project outward but stands in a position at right angles to the bolt.

The object of this invention is to simplify the construction of parts shown in the said patent, and the invention consists in the construction and arrangement of parts as hereinafter described and particularly recited in the claims.

In carrying out my invention I employ a bolt 10 which is preferably provided as herein shown with a rubber roll 11. This bolt is formed with a clearance opening 12 for the reception of a turn block 13, this block being provided with a radially projecting finger 14 adapted to travel in a notch 15 in the bolt, the notch forming shoulders 16 and 17. The turn block is provided with an angular hole 18 to be engaged by the angular shank 19 of a lever 20 which has a bearing upon the top 21 of a casing which, like the casing in the patent referred to, is formed from sheet metal and includes a bottom plate 22 provided with screw holes 23 by which they may be secured in position. The inner end 24 of the lever stem is upset over a washer 25 and preferably balls 26 will be located in chambers 27 formed for them, and normally forced outward by springs 28 into notches 29 in the top 21 of the casing.

The operation of the device is the same as in the patent referred to. That is, in the normal position as shown in Fig. 1, the lever stands in line with the bolt. To throw the bolt the lever will be turned to the position indicated by broken lines in Fig. 1, at which time the lug 14 engages with the shoulder 17 so that further movement of the lever will turn the bolt at right angles into its out or engaging position and the lever will stand at right angles thereto, or in the reverse position from that first mentioned. In the reverse movement the lever first turns without moving the bolt and then moves the bolt to the retired position. It will thus be seen that in either position of the bolt the lever is turned so that it will not project in such a way as to be unsightly or to be in such a position as to catch upon the clothing of a person passing the window.

I claim:

1. The combination with the casing of a lever mounted therein, said lever being formed with an angular shank, a turn block mounted on said shank and formed with a projecting lug, a bolt turning on said block and formed with a long notch for the reception of said lug whereby the handle has a certain amount of movement independent of the bolt.

2. The combination with the casing of a lever mounted therein, said lever being formed with an angular shank, a turn block mounted on said shank and formed with a projecting lug, a bolt turning on said block and formed with a long notch for the reception of said lug whereby the handle has a certain amount of movement independent of the bolt, and spring-pressed balls located between the lever and the top of said casing.

In testimony whereof I have signed this specification in the presence of two subscribing witnesses.

FRANKLIN H. HART.

Witnesses:
JENNETTE G. HYMAN,
J. L. BROCKETT.